United States Patent
Seliskar et al.

(10) Patent No.: US 9,957,381 B2
(45) Date of Patent: May 1, 2018

(54) INJECTION-MOLDABLE SOUND-DEADENING FILLED THERMOPLASTIC POLYOLEFIN COMPOSITION

(71) Applicant: Dow Global Technologies LLC, Midland, MI (US)

(72) Inventors: James T. Seliskar, Bay City, MI (US); James D. Oelberg, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days. days.

(21) Appl. No.: 14/425,069

(22) PCT Filed: Sep. 4, 2013

(86) PCT No.: PCT/US2013/057941
§ 371 (c)(1),
(2) Date: Mar. 2, 2015

(87) PCT Pub. No.: WO2014/039490
PCT Pub. Date: Mar. 13, 2014

(65) Prior Publication Data
US 2015/0210841 A1 Jul. 30, 2015

Related U.S. Application Data

(60) Provisional application No. 61/697,841, filed on Sep. 7, 2012.

(51) Int. Cl.
| | |
|---|---|
| *C08L 23/08* | (2006.01) |
| *B29C 45/00* | (2006.01) |
| *C08K 3/30* | (2006.01) |
| *C08L 23/14* | (2006.01) |
| *B29K 23/00* | (2006.01) |
| *B29L 31/00* | (2006.01) |

(52) U.S. Cl.
CPC ...... *C08L 23/0815* (2013.01); *B29C 45/0001* (2013.01); *C08K 3/30* (2013.01); *C08L 23/142* (2013.01); *B29K 2023/04* (2013.01); *B29K 2023/10* (2013.01); *B29L 2031/00* (2013.01); *C08L 2205/02* (2013.01); *C08L 2205/025* (2013.01); *C08L 2205/03* (2013.01)

(58) Field of Classification Search
CPC .......... C08L 53/00; C08L 23/04; C08L 23/06; C08L 23/08; C08L 23/0815; C08L 23/10; C08L 23/12; C08L 23/14; C08L 2205/02; C08L 2205/03
See application file for complete search history.

(56) References Cited

U.S. PATENT DOCUMENTS

| | | |
|---|---|---|
| 4,191,798 A | 3/1980 | Schumacher et al. |
| 4,222,924 A | 9/1980 | Schumacher |
| 4,263,196 A | 4/1981 | Schumacher et al. |
| 4,379,190 A | 4/1983 | Schenck |
| 4,403,007 A | 9/1983 | Coughlin |
| 4,430,468 A | 2/1984 | Schumacher |
| 4,434,258 A | 2/1984 | Schumacher et al. |
| 4,438,228 A | 3/1984 | Schenck |
| 6,472,042 B1 | 10/2002 | Dibbern et al. |
| 6,787,593 B2 | 9/2004 | Bell et al. |
| 7,741,397 B2 | 6/2010 | Liang et al. |
| 2009/0105374 A1* | 4/2009 | Wu .................... C08L 23/06 524/8 |
| 2009/0105404 A1* | 4/2009 | van Riel .............. C08F 297/08 524/528 |

FOREIGN PATENT DOCUMENTS

WO   WO 2006102155 A2 * 9/2006 ............. C08L 23/06

\* cited by examiner

*Primary Examiner* — Wenwen Cai

(57) ABSTRACT

The present invention relates to filled thermoplastic polyolefin compositions useful for use in sound-deadening articles for automotive applications comprising an olefin block copolymer, one or more linear ethylene polymer and/or substantially linear ethylene polymer, a propylene polymer, and a filler. Said compositions demonstrate a good balance of heat properties and stiffness such that it is particularly suitable for injection molding sound-deadening articles therefrom.

5 Claims, No Drawings

US 9,957,381 B2

INJECTION-MOLDABLE SOUND-DEADENING FILLED THERMOPLASTIC POLYOLEFIN COMPOSITION

FIELD OF THE INVENTION

The present invention relates to a filled thermoplastic composition having a good balance of heat performance and stiffness such that it is particularly suitable for injection molding into sound-deadening articles for use in vehicles. Specifically, the present invention is a composition comprising an olefin block copolymer, a linear ethylene polymer and/or substantially linear polymer, a propylene polymer, and a filler.

BACKGROUND OF THE INVENTION

It has long been known that interposing mass between a sound source and the area to be kept quiet is an effective means for attaining sound deadening. A sheet of lead is thin, flexible, often highly effective, but costly. The challenge, then, is to attain dense, thin, flexible sheet which can be interposed between a source of noise and the area to be quieted.

Sheets of thermoplastics or of rubber-like materials have long been used as sound-deadening means. To make the sheets flexible, dense, strong, and inexpensive has posed a challenge to compounders for many years. For some uses, such as automobile carpet underlayment, it is desirable that the sound-deadening sheet is also formable.

Sound-deadening sheets made from composites of filled thermoplastic compositions are well known for use in such automotive applications. The thermoplastic compositions typically comprise one or more polymer, a filler, and optionally a plasticizer. A number of patents have been granted for such highly filled thermoplastic compositions as represented by U.S. Pat. Nos. 4,191,798; 4,222,924; 4,263,196; 4,379,190; 4,403,007; 4,430,468; 4,434,258; 4,438,228; 6,472,042; and 6,787,593. Different systems of polymers and fillers with and without plasticizers have been proposed. For example, the above-mentioned patents disclose the use of ethylene interpolymers such as ethylene/vinyl ester, ethylene/unsaturated mono- or di-carboxylic acids, esters of unsaturated acids, metallocene catalyzed ethylene-alpha olefin interpolymers, etc. Blends of such ethylene interpolymers with other elastomers and polymers have also been proposed.

Notwithstanding the proposal of many different polymer based compositions for use in sound-deadening composites, ethylene vinyl acetate has been widely used on a commercial basis. For sheet or flat applications, such materials demonstrate adequate modulus while meeting a number of balanced properties such as impact strength, tensile, elongation, flex modulus and specific gravity. However, where the sound-deadening composition or composite is used in certain applications, such as flooring applications, where formability is a key requirement, ethyl vinyl acetate based compositions lack sufficient heat performance and stiffness requirements. Particularly useful compositions comprising an olefin block copolymer and a filler which demonstrate good elasticity and melt strength which are ideally suited for thermoforming articles demonstrating improved noise, vibration, and harshness properties are disclosed in U.S. Pat. No. 7,741,397, which is incorporated by reference herein in its entirety. However, these compositions may not meet more demanding heat performance and stiffness requirements for injection molding applications, which may, for example, result in binding or inadequate release from injection molds. It would be desirable to have a composition or composite having both heat performance and stiffness such that sound-deadening applications, especially into sound-deadening articles for use in vehicles, may be proficiently produced by an injection molding process.

SUMMARY OF THE INVENTION

The present invention is a filled thermoplastic polyolefin composition comprising: (i) an olefin block copolymer, comprising one or more hard segment and one or more soft segment having an MFR equal to or greater than 5 g/10 min (at 190° C. under an applied load of 2.16 kg); (ii) one or more linear ethylene polymer, one or more substantially linear ethylene polymer, or mixtures thereof wherein each linear ethylene polymer and/or substantially linear ethylene polymer independently have a density of equal to or greater than 0.9 g/cc; (iii) a propylene homopolymer and/or a random block copolymer wherein the propylene polymer has an MFR equal to or greater than 80 g/10 min (at 230° C. under an applied load of 2.16 kg); (iv) a filler; and (v) optionally one or more of a plasticizer, a slip agent, an ignition resistant additive, a stabilizer, a colorant, a pigment, an antioxidant, an antistat, a flow enhancer, a mold release, or a nucleating agent.

In a preferred embodiment of the present invention, the filled thermoplastic polyolefin composition described herein above comprises: (i) the olefin block copolymer, comprising one or more hard segment and one or more soft segment is characterized by one or more of the aspects described as follows: (i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship: $T_m > -2002.9 + 4538.5(d) - 2422.2(d)^2$ or $T_m > -6553.3 + 13735(d) - 7051.7(d)^2$; or (i.b) has a Mw/Mn from about 1.7 to about 3.5, and is characterized by a heat of fusion (ΔH) J/g and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships: ΔT>−0.1299(ΔH)+62.81 for ΔH greater than zero and up to 130 J/g, ΔT>48° C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481−1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.))

wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

In a preferred embodiment of the present invention, the filled thermoplastic polyolefin composition described herein above, comprises the olefin block copolymer in an amount of from 1 to 20 parts by weight; the one or more linear ethylene polymer, one or more substantially linear ethylene polymer, or mixtures thereof are present independently in an amount of from 1 to 20 parts by weight; the propylene homopolymer and/or a random block copolymer is present in an amount of from 1 to 15 parts by weight; the filler is present in an amount of from 50 to 80 parts by weight; and (iv) the optional one or more of a plasticizer, a slip agent, an ignition resistant additive, a stabilizer, a colorant, a pigment, an antioxidant, an antistat, a flow enhancer, a mold release, or a nucleating agent are independently present in an amount of from 0.1 to 10 parts by weight, wherein parts by weight are based on the total weight of the filled thermoplastic polyolefin composition.

In a preferred embodiment of the present invention, the propylene polymer of the filled thermoplastic polyolefin composition described herein above is a random propylene copolymer.

In a preferred embodiment of the present invention, the filler of the filled thermoplastic polyolefin composition described herein above is barium sulfate.

Another embodiment of the present invention is a process to make an injection molded article comprising the steps of
(A) injection molding a composition comprising a filled thermoplastic polyolefin composition comprising
(i) from 1 to 20 parts by weight of an olefin block copolymer, comprising one or more hard segment and one or more soft segment having an MFR equal to or greater than 5 g/10 min (at 190° C. under an applied load of 2.16 kg);
(ii) from 1 to 20 parts by weight of one or more linear ethylene polymer, one or more substantially linear ethylene polymer, or mixtures thereof wherein each linear ethylene polymer and/or substantially linear ethylene polymer independently have a density of equal to or greater than 0.9 g/cc;
(iii) from 1 to 15 parts by weight of a propylene homopolymer and/or a random block copolymer wherein the propylene polymer has an MFR equal to or greater than 80 g/10 min (at 230° C. under an applied load of 2.16 kg);
(iv) a filler;
and
(v) optionally from 0.1 to 10 parts by weight of one or more of a plasticizer, a slip agent, an ignition resistant additive, a stabilizer, a colorant, a pigment, an antioxidant, an antistat, a flow enhancer, a mold release, or a nucleating agent.
wherein parts by weight are based on the total weight of the filled thermoplastic polyolefin composition.

In a preferred embodiment of the present invention, the filled thermoplastic polyolefin composition described herein above is in the form of an injection molded article, preferably an injection molded under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim, trunk floor, or pressure sensitive damper.

DETAILED DESCRIPTION OF THE INVENTION

The filled thermoplastic polyolefin composition of the present invention is such an injection moldable composition comprising: (i) an olefin block copolymer, comprising one or more hard segment and one or more soft segment having an MFR equal to or greater than 5 g/10 min (at 190° C. under an applied load of 2.16 kg), preferably in an amount of from 1 to 20 parts by weight; (ii) one or more linear ethylene polymer, one or more substantially linear ethylene polymer, or mixtures thereof wherein each linear ethylene polymer and/or substantially linear ethylene polymer independently have a density of equal to or greater than 0.9 g/cc, preferably in an amount of from 1 to 20 parts by weight; (iii) a propylene homopolymer and/or a random block copolymer wherein the propylene polymer has an MFR equal to or greater than 80 g/10 min (at 230° C. under an applied load of 2.16 kg), preferably in an amount of from 1 to 15 parts by weight; (iv) a filler, preferably in an amount of from 50 to 80 parts by weight; and (v) optionally one or more of a plasticizer, a slip agent, an ignition resistant additive, a stabilizer, a colorant, a pigment, an antioxidant, an antistat, a flow enhancer, a mold release, or a nucleating agent, preferably in an amount of from 0.1 to 10 parts by weight, wherein parts by weight are based on the total weight of the filled thermoplastic polyolefin composition.

In a preferred embodiment of the present invention, the olefin block copolymer comprising one or more hard segment and one or more soft segment is characterized by one or more of the aspects described as follows: (i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship:

$T_m > -2002.9 + 4538.5(d) - 2422.2(d)^2$ or $T_m > -6553.3 + 13735(d) - 7051.7(d)^2$; or (i.b) has a Mw/Mn from about 1.7 to about 3.5, and is characterized by a heat of fusion ($\Delta H$) J/g and a delta quantity, $\Delta T$, in degrees Celsius defined as the temperature difference between the tallest differential scanning calorimetry (DSC) peak and the tallest crystallization analysis fractionation (CRYSTAF) peak, wherein the numerical values of $\Delta T$ and $\Delta H$ have the following relationships: $\Delta T > -0.1299(\Delta H) + 62.81$ for $\Delta H$ greater than zero and up to 130 J/g, $\Delta T > 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481−1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.)) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

In a preferred embodiment of the present invention, the propylene polymer of the filled thermoplastic polyolefin composition disclosed herein above is a random propylene copolymer.

In a preferred embodiment of the present invention, the filler of the filled thermoplastic polyolefin composition disclosed herein above is barium sulfate.

In a preferred embodiment of the present invention is a process to make an injection molded article comprising the steps of (A) injection molding the filled thermoplastic polyolefin composition disclosed herein above.

A preferred embodiment of the present invention is the filled thermoplastic polyolefin composition disclosed herein above in the form of an injection molded article, preferably in the form of injection molded under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim, trunk floor, or pressure sensitive damper.

The filled thermoplastic polyolefin composition of the present invention comprises (i) an elastomeric olefin block copolymer (OBC) which comprises therein one or more elastomeric or "soft" segment and one or more crystalline or "hard" segment. Preferably the OBC of the present invention is an ethylene/alpha-olefin interpolymer. The term "ethylene/alpha-olefin interpolymer" generally refers to polymers comprising ethylene and an alpha-olefin having 3 or more carbon atoms, such as propylene or other $C_4$ to $C_{20}$ alpha-olefins. Preferred alpha-olefins are propylene, 1-butene, 1-pentene, 1-hexene, 1-heptene, 1-decene, 1-dodecene, and most preferred is 1-octane. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an alpha-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer.

The term "multi-block copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1. When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

The olefin block copolymers (i) of the present invention are an alpha-olefin interpolymer, specifically an alpha-olefin block copolymer comprising one or more hard segment and one or more soft segment and characterized by one or more of the aspects described as follows:

(i.a) has a weight average molecular weight/number average molecular weight ratio ($M_w/M_n$) from about 1.7 to about 3.5, at least one melting point ($T_m$) in degrees Celsius (° C.), and a density (d) in grams/cubic centimeter (g/cc), wherein the numerical values of Tm and d correspond to the relationship:

$$T_m > -2002.9 + 4538.5(d) - 2422.2(d)^2 \text{ or } T_m > -6553.3 + 13735(d) - 7051.7(d)^2; \text{ or}$$

(i.b) has a $M_w/M_n$ from about 1.7 to about 3.5, and is characterized by a heat of fusion (ΔH) in Jules per gram (J/g) and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:

$$\Delta T > -0.1299(\Delta H) + 62.81 \text{ for } \Delta H \text{ greater than zero and up to } 130 \text{ J/g,}$$

$$\Delta T \geq 48° \text{ C. for } \Delta H \text{ greater than } 130 \text{ J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase:

$$Re > 1481 - 1629(d); \text{ or}$$

(i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or (i.g) has an average block index greater than zero and up to about 1.0 and a molecular weight distribution, $M_w/M_n$, greater than about 1.3.

Processes for making the ethylene/alpha-olefin interpolymers have been disclosed in, for example, the following patent applications and publications: U.S. Provisional Application Nos. 60/553,906, filed Mar. 17, 2004; 60/662,937, filed Mar. 17, 2005; 60/662,939, filed Mar. 17, 2005; 60/5662938, filed Mar. 17, 2005; PCT Application Nos. PCT/US2005/008916, filed Mar. 17, 2005; PCT/US2005/008915, filed Mar. 17, 2005; PCT/US2005/008917, filed Mar. 17, 2005; WO 2005/090425, published Sep. 29, 2005; WO 2005/090426, published Sep. 29, 2005; and WO 2005/090427, published Sep. 29, 2005, all of which are incorporated by reference herein in their entirety. For example, one such method comprises contacting ethylene and optionally one or more addition polymerizable monomers other than ethylene under addition polymerization conditions with a catalyst composition comprising the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

The following test methods are used to characterize the olefin block copolymers of the present invention and are discussed in further detail in U.S. Pat. No. 7,355,089 and USP Publication No. 2006/0199930:

"Standard CRYSTAF method" or crystallization analysis fractionation is used to determine branching distributions. CRYSTAF is determined using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

"Flexural/Secant Modulus/Storage Modulus" samples are compression molded using ASTM D 1928. Flexural and 2 percent secant moduli are measured according to ASTM D-790. Storage modulus is measured according to ASTM D 5026-01 or equivalent technique.

"Melt Flow Rate" or MFR, is measured in accordance with ASTM D 1238. When measured at conditions of 190° C./2.16 kg it is sometimes referred to as Melt Index $I_2$. When MFR is measured at conditions 190° C./10 kg it is sometimes referred to as Melt Index $I_{10}$. A useful value for comparison is the ratio $I_{10}/I_2$.

"DSC Standard Method" or Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion (ΔH) and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

The observed heat of fusion ($\Delta H_{observed}$) for the second scan is recorded. The observed heat of fusion is related to the degree of crystallinity in weight percent based on the weight of the OBC sample by the following equation:

$$\text{Crystallinity, \%} = \frac{\Delta H_{observed}}{\Delta H_{theoretical\ PE}} \times 100$$

where the heat of fusion for isotactic polypropylene ($\Delta H_{theoretical\ PE}$), as reported in B. Wunderlich, Macromolecular Physics, Volume 3, Crystal Melting, Academic Press, New Your, 1980, is 292 J/g of polymer.

"GPC Method" is gel permeation chromatographic for molecular weight determinations. The system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polymer Science, Polymer Letters, 6, 621 (1968)): $M_{polyethylene}=0.431(M_{polystyrene})$.

Polyethylene equivalent molecular weight calculations are performed using Viscotek TriSEC software Version 3.0.

"Density" measurement samples are prepared according to ASTM D 1928. Measurements are made within one hour of sample pressing using ASTM D792, Method B.

"ATREF" is analytical temperature rising elution fractionation analysis and is conducted according to the method described in U.S. Pat. No. 4,798,081, which is incorporated by reference herein in their entirety, and Wilde, L.; Ryle, T. R.; Knobeloch, D. C.; Peat, I. R.; *Determination of Branching Distributions in Polyethylene and Ethylene Copolymers*, J. Polymer Science, 20, 441-455 (1982). The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

"$^{13}$C NMR Analysis" samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

"Mechanical Properties—Tensile, Hysteresis, and Tear", stress-strain behavior in uniaxial tension is measured using ASTM D 1708 microtensile specimens. Samples are stretched with an INSTRON™ at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an INSTRON instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

"Block Index" of the ethylene/α-olefin interpolymers is characterized by an average block index (ABI) which is greater than zero and up to about 1.0 and a molecular weight distribution, $M_w/M_n$, greater than about 1.3. The ABI is the weight average of the block index (BI) for each of the polymer fractions obtained in preparative TREF (fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows:

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the ATREF (analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments"

(which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$\text{Ln } P_{AB} = \alpha/T_{AB} + \beta$$

where $\alpha$ and $\beta$ are two constants which can be determined by a calibration using a number of well characterized preparative TREF fractions of a broad composition random copolymer and/or well characterized random ethylene copolymers with narrow composition. It should be noted that $\alpha$ and $\beta$ may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. Random ethylene copolymers and/or preparative TREF fractions of random copolymers satisfy the following relationship:

$$\text{Ln } P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from Ln $PX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from Ln $P_{XO} = \alpha/T_X + \beta$ using a measured value of $T_X$. Once the block index (BI) for each preparative TREF fraction is obtained, the weight average block index, ABI, for the whole polymer can be calculated. Determination of Block Index is also described in US Patent Application Publication No. 2006-019930, which is herein incorporated by reference.

The olefin block copolymers of the present invention have a block index (weight averaged) greater than zero and up to about 1.0, preferably from 0.15 to 0.8, more preferably from 0.2 to 0.7, even more preferably from 0.4 to 0.6.

The olefin block copolymer is employed in the filled thermoplastic polyolefin composition of the present invention in an amount equal to or greater than about 1 part by weight, preferably equal to or greater than about 3 parts by weight, more preferably equal to or greater than about 5 parts by weight based on the weight of the total composition. In general, the olefin block copolymer is used in amounts less than or equal to about 20 parts by weight, preferably less than or equal to about 15 parts by weight, more preferably less than or equal to about 10 parts by weight based on the weight of the total composition.

The filled thermoplastic polyolefin composition of the present invention further comprises an elastomeric component, component (ii). A preferred elastomeric component is one or more substantially linear ethylene polymer or one or more linear ethylene polymer (S/LEP), or mixtures thereof. Both substantially linear ethylene polymers and linear ethylene polymers are known. Substantially linear ethylene polymers and their method of preparation are fully described in U.S. Pat. No. 5,272,236 and U.S. Pat. No. 5,278,272. Linear ethylene polymers and their method of preparation are fully disclosed in U.S. Pat. No. 3,645,992; U.S. Pat. No. 4,937,299; U.S. Pat. No. 4,701,432; U.S. Pat. No. 4,937,301; U.S. Pat. No. 4,935,397; U.S. Pat. No. 5,055,438; EP 129,368; EP 260,999; and WO 90/07526.

Suitable S/LEP comprises one or more $C_2$ to $C_{20}$ alpha-olefins in polymerized form, having a $T_g$ less than 25° C., preferably less than 0° C., most preferably less than −25° C. Examples of the types of polymers from which the present S/LEP are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by in situ generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n−2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight alpha-olefin copolymers under the process conditions. As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than about 0.875 grams per cubic centimeter (g/cm³), preferably equal to or greater than about 0.9 g/cm³. Generally, the density of these substantially linear ethylene polymers or linear ethylene polymers is less than or equal to about 0.91 g/cm³, preferably less than or equal to about 0.93 g/cm³. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is MFR measured according to ASTM Designation D 1238 using conditions of 190° C. and 2.16 kilogram (kg) mass. $I_{10}$ is MFR measured according to ASTM Designation D 1238 using conditions of 190° C. and 10.0 kg mass.

The $M_w/M_n$ for substantially linear ethylene polymers is the weight average molecular weight ($M_w$) divided by number average molecular weight ($M_n$). $M_w$ and $M_n$ are measured by gel permeation chromatography (GPC). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2) - 4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single DSC melting peak.

The preferred MFR for these substantially linear ethylene polymers or linear ethylene polymers is from about 0.01 g/10 min to about 100 g/10 min, more preferably about 0.1 g/10 min to about 10 g/10 min, and even more preferably about 1 g/10 min to about 5 g/10 min.

The preferred $M_w$ for these substantially linear ethylene polymers or linear ethylene polymers is equal to or less than about 180,000, preferably equal to or less than about 160,000, more preferably equal to or less than about 140,000 and most preferably equal to or less than about 120,000. The preferred $M_w$ for these substantially linear ethylene polymers or linear ethylene polymers is equal to or greater than about 40,000, preferably equal to or greater than about 50,000, more preferably equal to or greater than about 60,000, even more preferably equal to or greater than about 70,000, and most preferably equal to or greater than about 80,000.

The substantially linear ethylene polymer and/or linear ethylene polymer is employed in the filled thermoplastic polyolefin composition of the present invention in an amount equal to or greater than about 1 part by weight, preferably equal to or greater than about 3 parts by weight, more preferably equal to or greater than about 5 parts by weight based on the weight of the total composition. In general, the substantially linear ethylene polymer and/or linear ethylene polymer is used in amounts less than or equal to about 20 parts by weight, preferably less than or equal to about 15 parts by weight, more preferably less than or equal to about 10 parts by weight based on the weight of the total composition.

The filled thermoplastic polyolefin composition of the present invention further comprises a propylene polymer as component (iii). The propylene polymer suitable for use in this invention is well known in the literature and can be prepared by known techniques. In general, the propylene polymer is in the isotactic form, although other forms can also be used (e.g., syndiotactic or atactic). The propylene polymer used for the present invention is preferably a homopolymer of polypropylene or more preferably a copolymer, for example, a random or block copolymer, of propylene and an alpha-olefin, preferably a $C_2$ or $C_4$ to $C_{20}$ alpha-olefin. The alpha-olefin is present in the propylene copolymer of the present invention in an amount of not more than 20 percent by mole, preferably not more than 15 percent, even more preferably not more than 10 percent and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

The propylene polymer of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometalic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Polypropylene is commonly made by catalytically reacting propylene in a polymerization reactor with appropriate molecular weight control agents. Nucleating agent is added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in *Modern Plastics Encyclopedia*/89, mid October 1988 Issue, Volume 65, Number 11, pp. 86-92, the entire disclosure of which is incorporated herein by reference. The molecular weight of the propylene polymer for use in the present invention is conveniently indicated using a melt flow measurement, such as melt flow rate (mfr) or melt index (MI) (determined according to ASTM D 1238 at 230° C. and an applied load of 2.16 kg). Melt flow rate is inversely proportional to the molecular weight of the polymer. Thus, the higher the molecular weight, the lower the melt flow rate, although the relationship is not linear. The MFR for the propylene polymer useful herein is generally greater than about 80 grams/10 minutes (g/10 min.), preferably greater than about 100 g/10 min. The MFR for the propylene polymer useful herein is generally less than about 200 g/10 min., more preferably less than about 150 g/10 min.

The density of the propylene polymer used in the present invention is preferably equal to or greater than 0.885 grams per cubic centimeter ($g/cm^3$), more preferably equal to or greater than 0.890 $g/cm^3$, and most preferably equal to or greater than 0.900 $g/cm^3$.

In a preferred embodiment of the present invention, the propylene polymer is a random propylene copolymer.

In another embodiment, the propylene polymer of the present invention preferably has a density equal to or greater than 0.9 $g/cm^3$.

In another embodiment, the propylene polymer of the present invention has an MFR of from 80 to 120 g/10 min at 230° C. under a load of 2.16 kg.

Generally the propylene polymer is used in the filled thermoplastic polyolefin composition of the present invention in an amount equal to or greater than about 1 parts by weight, preferably equal to or greater than about 2 parts, more preferably equal to or greater than about 3 parts, and even more preferably equal to or greater than about 5 parts by weight based on the total weight of the filled thermoplastic polyolefin composition. Generally the propylene polymer is used in the filled thermoplastic polyolefin composition of the present invention in an amount equal to or less than about 15 parts by weight, preferably equal to or less than about 12 parts, more preferably equal to or less than about 10 parts, and even more preferably equal to or less than about 8 parts by weight based on the total weight of the filled thermoplastic polyolefin composition.

Component (iv) in the thermoplastic polyolefin composition of the present invention is one or more filler. Suitable fillers are calcium carbonate, barium sulfate, fly ash, talc, clay, mica, wollastonite, hollow glass beads, titaninum oxide, silica, carbon black, glass fiber, potassium titanate, cement dust, feldspar, nepheline, glass, fumed silica, alumina, magnesium oxide, zinc oxide, aluminum silicate, calcium silicate, titanium dioxide, titanates, glass microspheres, or chalk. Of these fillers, barium sulfate, talc, calcium carbonate, silica/glass, alumina and titanium dioxide, and mixtures thereof, are preferred; of these, calcium carbonate and barium sulfate are most preferred. See for example U.S. Pat. Nos. 6,472,042; 5,091,461; and 3,424,703 incorporated by reference herein in their entirety and EP 639,613 A1 and EP 391,413, where these materials and their suitability as filler for polymeric resins are generally described. The fillers used in the present invention may or may not be coated, for example with a fatty acid.

Among other properties, the density of the filler(s) selected will influence the filler loading level to obtain optimized sound-deadening performance in the filled thermoplastic polyolefin compositions according to the present invention. Generally, the filler is employed in an amount of at least about 50 part by weight, preferably at least about 60 parts by weight, more preferably at least about 65 parts by weight based on the total weight of the composition. Generally, an amount of filler up to and including about 80 parts by weight, preferably up to and including about 75 parts by weight, more preferably up to and including about 70 parts by weight based the total weight of the composition.

The claimed filled thermoplastic polyolefin compositions of the present invention may also optionally contain (v) one or more additives that are commonly used in filled thermoplastic polyolefin compositions of this type. For example a plasticizer, slip agent, preferred slip agents are a saturated fatty acid amide or ethylenebis(amide), an unsaturated fatty acid amide or ethylenebis(amide) or combinations thereof. Other optional additives include, but are not limited to: ignition resistant additives, stabilizers, colorants, pigments, antioxidants, antistats, flow enhancers, mold releases, such as stearic acid, metal stearates (e.g., calcium stearate, magnesium stearate), nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 0.5 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the filled thermoplastic polyolefin compositions of this invention can be accomplished by any suitable mixing means known in the art, including being prepared in a reactor, powder-powder blending, or preferably dry blending the individual components, and subsequently melt mixing sometimes referred to as compounding (e.g., using a Banbury mixer, an extruder, roll mill, etc.). The melt blended filled thermoplastic polyolefin of the present invention may be first comminuted to pellets then subsequently injection molded.

The process of compounding comprises the steps of combining and melt blending/mixing various polymer materials, fillers, additives, color and oil under heat and/or pressure where the final product is an homogeneous molten state which may then be extruded into strands, pellets or sheet for further use, for example producing sound-deadening articles for use in vehicles such as heavy layer products. Dispersive and distributive mixing may be accomplished through both thermal heating and mechanical shearing via single or twin screw configurations.

Injection molding machines typically comprise a plasticating unit i.e., a hopper, a feed throat, barrel comprising a screw, a screw/check valve, one or more heater bands, a clamping device, and a mold. Filled thermoplastic polyolefin compositions of the present invention are fed into a hopper and/or feed throat of the barrel having a screw which turns within the barrel imparting heat and shear to the filled thermoplastic polyolefin composition causing it to melt. The molten material is conveyed forward past a check valve and is injected into a mold having a cavity having the shape of the desired article under high pressure. The molded article/mold is cooled, for instance by chilled water, allowing the shaped filled thermoplastic polyolefin compositions to solidify and the injection molded article is ejected. The filled thermoplastic polyolefin composition of the present invention have a good blend of thermal and stiffness properties which facilitate adequate release from injection molds without binding.

A particularly suitable process for injection molding the filled thermoplastic polyolefin compositions of the present invention is compounding injection molding (CIM) which combines the two processes, compounding and injection molding, into one piece of equipment. For example, Krauss Maffei manufactures CIM equipment which they refer to as an injection molding compounder (IMC).

The filled thermoplastic polyolefin compositions of the present invention are useful as injection molded automotive articles which provide, among other properties, sound-deadening, dampening, insulation, and/or absorbance. For example, under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim, trunk floor, pressure sensitive damper, and the like.

To illustrate the practice of this invention, examples of preferred embodiments are set forth below. However, these examples do not in any manner restrict the scope of this invention.

EXAMPLES

Comparative Example A and Example 1 comprise an olefin block copolymer, a substantially linear ethylene polymer, a propylene polymer, a filler, a plasticizer, and mineral oil. The components are dry blended and feed into a 3000 Ton Krauss Maffei injection molding compounder and molded into a 3 mm thick heavy layer article the width of the car weighing 3.5 pounds. The molding parameters are: 240° C. melt temperature, 15° C. mold temperature, enough injection pressure to fill the tool, hold pressure 500 bar with a cycle time less than one minute.

The compositions for Comparative Example A and Example 1 are given in Table 1 below in parts by weight based on the weight of the total composition. In Table 1:

"SLEP-1" is a substantially linear ethylene-octene copolymer having a density of 0.875 g/cm$^3$ and a MFR of 3 g/10 min at 190° C. under a load of 2.16 kg, and a Shore A hardness of 74 available as ENGAGE™ 8457 Polyolefin Elastomer from The Dow Chemical Company;

"SLEP-2" is a substantially linear ethylene-octene copolymer having a density of 0.908 g/cm$^3$, a MFR of 1 g/10 min at 190° C. under a load of 2.16 kg, and a Shore A hardness of 90 available as ENGAGE™ 8540 Polyolefin Elastomer from The Dow Chemical Company;

"OBC-1" is an ethylene-octene block copolymer having MFR (190° C./2.16 kg) of 5 g/10 min, a density of 0.866 g/cc, a melting temperature determined by DSC of 119° C., and a Shore A hardness of 60 available as INFUSE™ 9507 from The Dow Chemical Company;

"OBC-2" is an ethylene-octene block copolymer having an MFR (190° C./2.16 kg) of 15 g/10 min, a density of 0.866 g/cc, a melting temperature determined by DSC of 118° C., and a Shore A hardness of 55 available as INFUSE 9807 from The Dow Chemical Company;

"SLEP-1" is a substantially linear ethylene-octene copolymer having a density of 0.875 g/cm$^3$ and a MFR of 3 g/10 min at 190° C. under a load of 2.16 kg, and a Shore A hardness of 74 available as ENGAGE™ 8457 Polyolefin Elastomer from The Dow Chemical Company;

"SLEP-2" is a substantially linear ethylene-octene copolymer having a density of 0.908 g/cm$^3$, a MFR of 1 g/10 min at 190° C. under a load of 2.16 kg, and a Shore A hardness of 90 available as ENGAGE 8540 Polyolefin Elastomer from The Dow Chemical Company;

"PP-1" is a random propylene copolymer, high rubber extrusion grade propylene polymer with a density of 0.91 g/cm$^3$, a MFR of 120 g/10 min determined at 230° C. under a load of 2.16 kg, having Shore A hardness greater than 90 available as MOPLEN™ HP 500V from LyondellBasell;

"PP-2" is a random propylene copolymer having a density of 0.9 g/cm$^3$, a MFR of 100 g/10 min determined at 230° C. under a load of 2.16 kg, having an Shore A hardness of greater than 90 available as Polypropylene PR 7032 RNA Propylene Resin; and "BaSO$_4$" is barium sulfate having a specific gravity of 4.1 available as ExBAR™ 325 from ExCaliBar Materials, LLC.

Properties for Comparative Example A and Example 1 are determined according to the following tests. Results are listed in Table 1:

"MFR" is melt flow rate determined at 230° C. under a load of 2.16 kg determined according to ASTM D 1238;

"Tear Strength" is tear strength and is determined according to DIN ISO 34-1; and "Tensile Strength", "Tensile at Yield", "Tensile at Break", and Elongation at Break" are determined according to DIN 53504 S2.

If an injection molded article does not release from the injection mold, even though mold release may be present, it is described as failing the demold test. If the injection molded article releases from the mold and/or can be picked off the mold by a robot it is described as passing the demold test.

TABLE 1

|  | Comparative Example A* | Example 1 |
|---|---|---|
| COMPONENT |  |  |
| OBC-1 | 5.6 |  |
| OBC-2 |  | 5.2 |
| SLEP-1 | 8 |  |
| SLEP-2 |  | 7.9 |
| PP-1 |  | 5 |
| PP-2 | 7 |  |
| BaSO$_4$ | 75 | 75 |
| Mineral Oil | 4 | 6.5 |
| Plasticizer | 0.4 | 0.4 |
| PROPERTIES |  |  |
| MFR, g/10 min | 35 | 62 |
| Tear Strength, kN/m | 26.2 | 19.9 |
| Tensile Yield, N/mm$^2$ | N/A | 2.03 |
| Elongation at Max. Force, % | N/A | 278 |
| Tensile at Break, N/mm$^2$ | N/A | 1.67 |
| Elongation at Break, % | N/A | 286 |
| Demold from Injection Mold | Fail | Pass |

*not an example of the present invention

What is claimed is:

1. A process to make an injection molded article comprising a filled thermoplastic polyolefin composition comprising the steps of:
   (A) compounding a filled thermoplastic polyolefin composition into a homogeneous molten state wherein said filled thermoplastic polyolefin composition comprises:
      (i) from 1 to 20 parts by weight of an ethylene-octene block copolymer, comprising one or more hard segment and one or more soft segment, wherein the ethylene-octene block copolymer has an MFR greater than 5 g/10 min (at 190° C. under an applied load of 2.16 kg) and a Shore A hardness equal to 55;
      (ii) from 1 to 20 parts by weight of one or more linear ethylene polymer, one or more substantially linear ethylene polymer, or mixtures thereof wherein each linear ethylene polymer and/or substantially linear ethylene polymer independently have a density of equal to or greater than 0.9 g/cc;
      (iii) from 1 to 15 parts by weight of a propylene homopolymer and/or a random propylene and an alpha-olefin copolymer and/or a block propylene and an alpha-olefin copolymer wherein the propylene polymer having an MFR equal to or greater than 80 g/10 min (at 230° C. under an applied load of 2.16 kg);
      (iv) a filler selected from calcium carbonate, barium sulfate, fly ash, talc, clay, mica, wollastonite, hollow glass beads, titanium oxide, silica, carbon black, potassium titanate, cement dust, feldspar, nepheline, fumed silica, alumina, magnesium oxide, zinc oxide, aluminum silicate, calcium silicate, titanium dioxide, titanates, glass microspheres, or chalk; and
      (v) optionally from 0.1 to 10 parts by weight of one or more of a plasticizer, a slip agent, an ignition resistant additive, a stabilizer, a colorant, a pigment, an antioxidant, an antistat, a flow enhancer, a mold release, or a nucleating agent,
   wherein parts by weight are based on the total weight of the filled thermoplastic polyolefin composition;
   (B) extruding said homogeneous molten composition into pellets, and
   (C) injection molding said pellets into an injection molded article.

2. The process of claim 1 wherein the injection molded article is an automotive heavy layer article for sound-deadening.

3. The process of claim 2 wherein the injection molded article is selected from an under hood insulation, an outer/inner dash insulation, an upper/side cowl insulation, a throw mat underlay, a carpet underlay, a floor damper, a door insulation, a header insulation, a rear seat bottom/strainer, a rear quarter/pillar trim, a package tray, a rear wheelhouse, a trunk trim, a trunk floor, or a pressure sensitive damper.

4. The process of claim 1 wherein (iii) is a random propylene and an alpha-olefin copolymer.

5. The process of claim 1 wherein the filler (iv) is barium sulphate.

* * * * *